(12) United States Patent
Nakai et al.

(10) Patent No.: US 11,659,110 B2
(45) Date of Patent: May 23, 2023

(54) IMAGE FORMING DEVICE WHICH IS INSTALLED IN A STORE OR THE LIKE, AND IS CAPABLE OF PROVIDING SERVICES AS AN INFORMATION TERMINAL

(71) Applicant: SHARP KABUSHIKI KAISHA, Sakai (JP)

(72) Inventors: Yasuhiro Nakai, Sakai (JP); Kohichi Murakami, Sakai (JP); Yasutomo Hayano, Sakai (JP); Emiko Matsuo, Sakai (JP); Masao Saeda, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/578,157

(22) Filed: Jan. 18, 2022

(65) Prior Publication Data

US 2022/0256045 A1  Aug. 11, 2022

(30) Foreign Application Priority Data

Feb. 5, 2021  (JP) .............................. JP2021-017571

(51) Int. Cl.
*H04N 1/00* (2006.01)

(52) U.S. Cl.
CPC ..... *H04N 1/00474* (2013.01); *H04N 1/00082* (2013.01); *H04N 1/00503* (2013.01); *H04N 2201/0094* (2013.01)

(58) Field of Classification Search
CPC .......... H04N 1/00474; H04N 1/00082; H04N 1/00503; H04N 2201/0094
USPC ....................................................... 358/1.13
See application file for complete search history.

(56) References Cited

U.S. PATENT DOCUMENTS

| 2015/0172485 A1* | 6/2015 | Ikkanzaka | .......... H04N 1/00474 |
| | | | 358/1.13 |
| 2017/0324878 A1* | 11/2017 | Ebitani | .............. H04N 1/00474 |

FOREIGN PATENT DOCUMENTS

JP         2011-151570 A      8/2011

* cited by examiner

*Primary Examiner* — Neil R McLean
(74) *Attorney, Agent, or Firm* — ScienBiziP, P.C.

(57) ABSTRACT

This image forming device is capable of providing a plurality of usage services, and requires an operation setting for selecting a usage service at the time of use. The image forming device includes a touch panel that accepts a user operation while presenting an operation screen, and a controller that controls the operation screen of the touch panel. At least some of the usage services provided by the image forming device require operation of a reception device (document reader, media reader, QR code reader, or NFC card reader) provided in the image forming device, or connected to the image forming device. When a reception device is operated before an operation setting for usage service selection is performed on the touch panel, the controller switches to an operation screen that shows a preferential display of a usage service which is applicable to the reception device that has been operated.

5 Claims, 7 Drawing Sheets

FIG. 4

| RECEPTION DEVICE OPERATED | APPLICABLE USAGE SERVICES | DETECTION CONTENT OF RECEPTION DEVICE | USAGE SERVICE BUTTONS/SCREEN DISPLAYED |
|---|---|---|---|
| DOCUMENT READER | COPY, FAX, SCAN SERVICES | DOCUMENT SIZE | COPY, FAX, SCAN SERVICE BUTTONS |
| | | DRIVER'S LICENSE/CARD | GUIDANCE TO "COPY→DRIVER'S LICENSE/CARD" COPY BUTTON |
| | | POSTCARD | GUIDANCE TO "COPY→POSTCARD" COPY BUTTON |
| | | PHOTOGRAPH (L SIZE, 2L SIZE) | GUIDANCE TO "COPY→PHOTOGRAPH" COPY BUTTON |
| NFC CARD READER | ADMINISTRATIVE SERVICES, NETWORK PRINTING SERVICES | BASIC RESIDENT CARD/ MY NUMBER CARD | ADMINISTRATIVE SERVICES BUTTON |
| | | ELECTRONIC MONEY CARD | MFP PORTAL SCREEN |
| | | EMPLOYEE ID CARD | NETWORK PRINTING CORPORATE ACCOUNT SCREEN |
| QR CODE READER | NETWORK PRINTING, CONTENT PRINTING, AND TICKET RESERVATION SERVICES | LOGIN ID FOR NETWORK PRINTING | NETWORK PRINTING SERVICE LOGIN SCREEN |
| | | CONTENT PRINTING SERVICE CODE | CONTENT PRINTING CONTENT CONFIRMATION SCREEN |
| | | QR CODE ELECTRONIC MONEY CODE | MFP PORTAL SCREEN |
| | | TICKET RESERVATION CODE | MMK TICKET RESERVATION CONFIRMATION SCREEN |
| MEDIA READER | PRINTING SERVICES | OFFICE DATA SUCH AS EXCEL OR WORD DATA | OFFICE DIRECT PRINTING SERVICES BUTTON |
| | | IMAGE DATA SUCH AS JPEG OR TIFF DATA | IMAGE PRINTING SERVICES BUTTON |
| | | MIXED DATA CONTAINING OFFICE DATA AND IMAGE DATA | PRINTING SERVICES BUTTON |

IMAGE FORMING DEVICE WHICH IS INSTALLED IN A STORE OR THE LIKE, AND IS CAPABLE OF PROVIDING SERVICES AS AN INFORMATION TERMINAL

BACKGROUND OF THE INVENTION

Field of the Invention

The present invention relates to an image forming device which is installed in a store or the like, and is capable of providing services as an information terminal.

Description of the Background Art

Image forming devices such as multi-copiers are installed in stores such as convenience stores, and are configured such that an unspecified number of users are able to use various functions (such as a copy function, fax function, scan function, or print function) of the multi-copier. In addition to these functions, multi-copiers for convenience stores are increasingly serving as information terminals, and there is a trend toward diversification of the services that can be provided.

The diversification of the services provided by multi-copiers for convenience stores has led in an increase in the number of service buttons on the portal screen, which has resulted in the button size becoming smaller, and the screen layout becoming more complicated. This causes problems such as users taking a long time when selecting a service, and operations may need to be repeated due to service selection errors.

In addition, Japanese Unexamined Patent Application Publication No. 2011-151570 discloses a technique for a document reading device provided in an image forming device that, even without a document reading instruction, causes reading of a document to start when a user places a document on a document table and closes a pressure plate for pressing the document. In the technique of Japanese Unexamined Patent Application Publication No. 2011-151570, the operation of the document reading instruction by the user can be omitted. However, when a service to be used is selected from among a plurality of services, it is not possible to simplify the service selection operation.

The present invention has been made in view of the above problems. An object of the present invention is to provide an image forming device with improved convenience by supporting service selection by a user.

SUMMARY OF THE INVENTION

In order to solve the above problems, an image forming device of the present invention is of providing a plurality of types of usage services, and requires an operation setting for selecting a usage service at the time of use, and includes: an operation acceptor that accepts an operation by a user while presenting an operation screen; and a controller that controls the operation screen of the operation acceptor; wherein at least some of the usage services further require an operation with respect to a reception device which is either provided in the image forming device, or connected to the image forming device, and the controller, in a case where an operation is performed with respect to the reception device before an operation setting for usage service selection is performed by the operation acceptor, switches to an operation screen that shows a preferential display of a usage service which is applicable to the reception device that has been operated.

According to the configuration described above, at the time of usage service selection, in addition to the general procedure of performing a touch operation with respect to a service button from the operation acceptor, by detecting an operations with respect to a reception device other than the operation acceptor, it is possible to automatically switch to an operation screen which is narrowed down to an applicable service of the reception device that has been operated. An operation screen that has been narrowed down to an applicable service in this way allows the user to omit the effort of selecting the desired service from among a plurality of service buttons, and the desired service can be quickly selected and set.

Furthermore, the image forming device above can be configured such that, in the preferential display, it is possible to selectively display only a service button of a usage service applicable to the reception device that has been operated.

Moreover, the image forming device above can be configured such that a usage service correspondence table that associates the reception device and a usage service applicable to the reception device is stored in advance, and the preferential display is based on the usage service correspondence table.

In addition, the image forming device above can be configured such that the controller is capable of confirming whether or not operation assistance determination content exists in a detection content of the reception device, and when the operation assistance determination content exists, further narrows down the usage service which is applicable according to the operation assistance determination content, and shows a guidance display to a narrowed-down usage service.

According to the configuration described above, when operation assistance determination content exists in the detection content of the reception device, the convenience for the user can be further improved by showing a guidance display to a narrowed-down usage service using the operation assistance determination content.

Furthermore, the image forming device above can be configured such that the controller, in a case where an operation of the reception device is further performed after an operation setting for usage service selection has been partially performed by the operation acceptor, shows a preferential display of a usage service in such a way to reflect both a setting status by the operation setting and an operation status of the reception device.

According to the configuration described above, the convenience for the user can be further improved by showing a preferential display of the usage service in such a way to reflect both a setting status by the operation setting and an operation status of the reception device.

The image forming device of the present invention has the effect of supporting service selection by the user by detecting an operation performed by the user with respect to a reception device, and automatically switching to an operation screen which is narrowed down to an applicable service of the reception device that has been operated.

BRIEF DESCRIPTION OF THE DRAWINGS

FIG. 4 is a diagram showing an example of a usage service correspondence table.

DESCRIPTION OF THE PREFERRED EMBODIMENTS

First Embodiment

An embodiment of the present invention will be described below in detail with reference to the drawings. The image forming device 10 according to the present embodiment is, for example, a multi-copier which is installed in a store such as a convenience store, and is capable of providing various services to an unspecified number of users. That is to say, the image forming device 10 is not only capable of using various functions of a multi-copier (such as a copy function, fax function, scan function, and print function), but also serves as an information terminal that can provide services using the Internet.

The image forming device 10 improves convenience when the device is used by a user by supporting service selection. That is to say, the image forming device 10 is characterized by a method that supports service selection, and the basic configuration of the image forming device itself is known. Therefore, in the present embodiment, the description of the basic configuration of the image forming device 10 will be omitted, and only the characteristic parts will be described.

Figure 1:
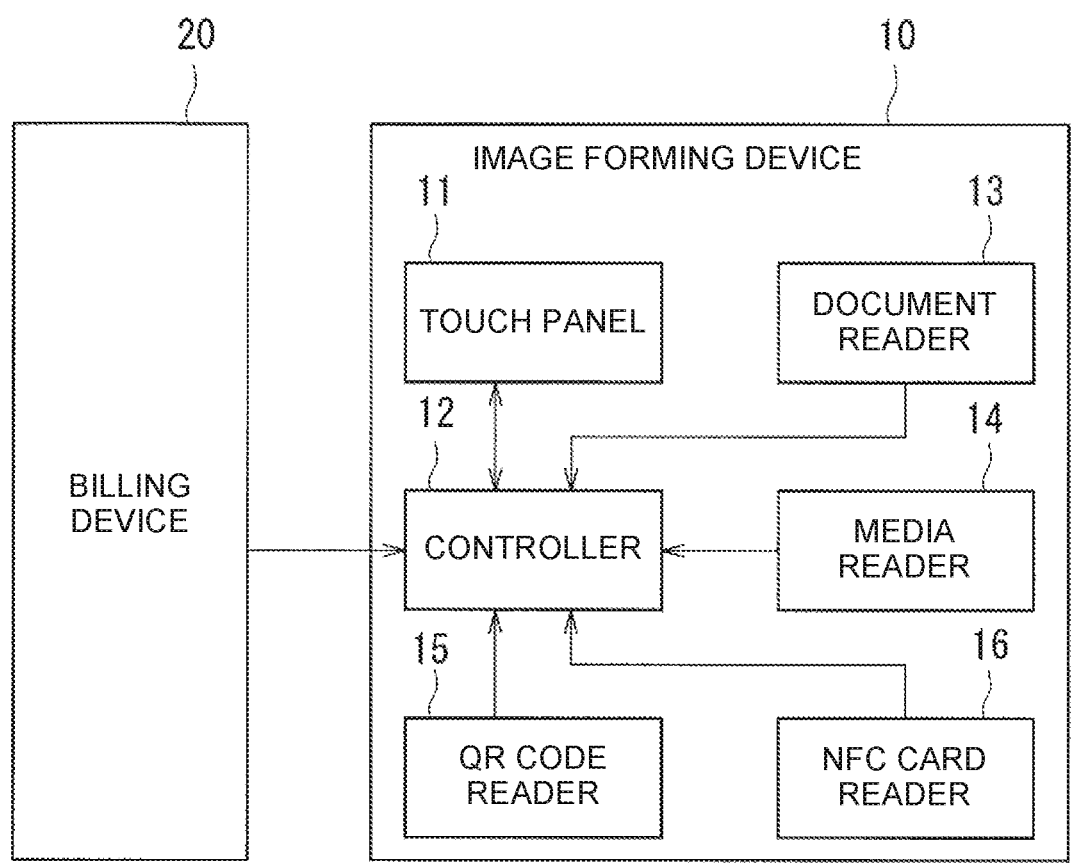
FIG. 1 represents an embodiment of the present invention, and is a functional block diagram of a configuration that relates to a service selection method of an image forming device.

FIG. 1 is a functional block diagram showing the characteristic configuration of the image forming device 10, that is to say, the configuration relating to the service selection method. As shown in FIG. 1, the image forming device 10 has a touch panel 11 serving as an operation acceptor. When a user inputs an operation via the touch panel 11, the operation content is recognized by a controller 12. The controller 12 also controls the operation screen of the touch panel 11.

Furthermore, in the image forming device 10, at least some of the services that are used require operation of a specific reception device. In the present embodiment, the image forming device 10 includes a document reader 13, a media reader 14, a QR code reader 15, and an NFC (Near Field Communication) card reader 16 as reception devices.

The document reader 13 is a reception device for reading a document when using services that require reading of a document (a copy, fax, or scanning service). The media reader 14 is a reception device to which a user attaches a recording medium (such as a USB memory) when using a printing service. The QR code reader 15 is a reception device for reading a QR code (registered trademark) displayed on a smartphone (or printed on a printed item) when using an Internet service (network printing, content printing, or an MMK (Multi Media Kiosk) service such as a ticket reservation service). The NFC card reader 16 is a reception device for reading an NFC card (such as a basic resident card or My Number card) when using an Internet service (such as an administrative service or network printing service). Note that, when the user performs an operation with respect to one of the reception devices, the controller 12 of the image forming device 10 recognizes the reception device that has been operated.

Furthermore, the reception devices are not limited to those that are included in the image forming device 10, and may also be provided in a peripheral device which is communicatively connected to the image forming device 10. For example, an image forming device 10 installed in a store is usually combined with a billing device 20 (see FIG. 1). In this case, reception devices may be provided on the billing device 20 side. For example, a reception device for the user to credit the image forming device 10 (such as a coin vendor or an NFC card reader for reading an electronic money card) can be provided in the billing device 20.

Figure 2:
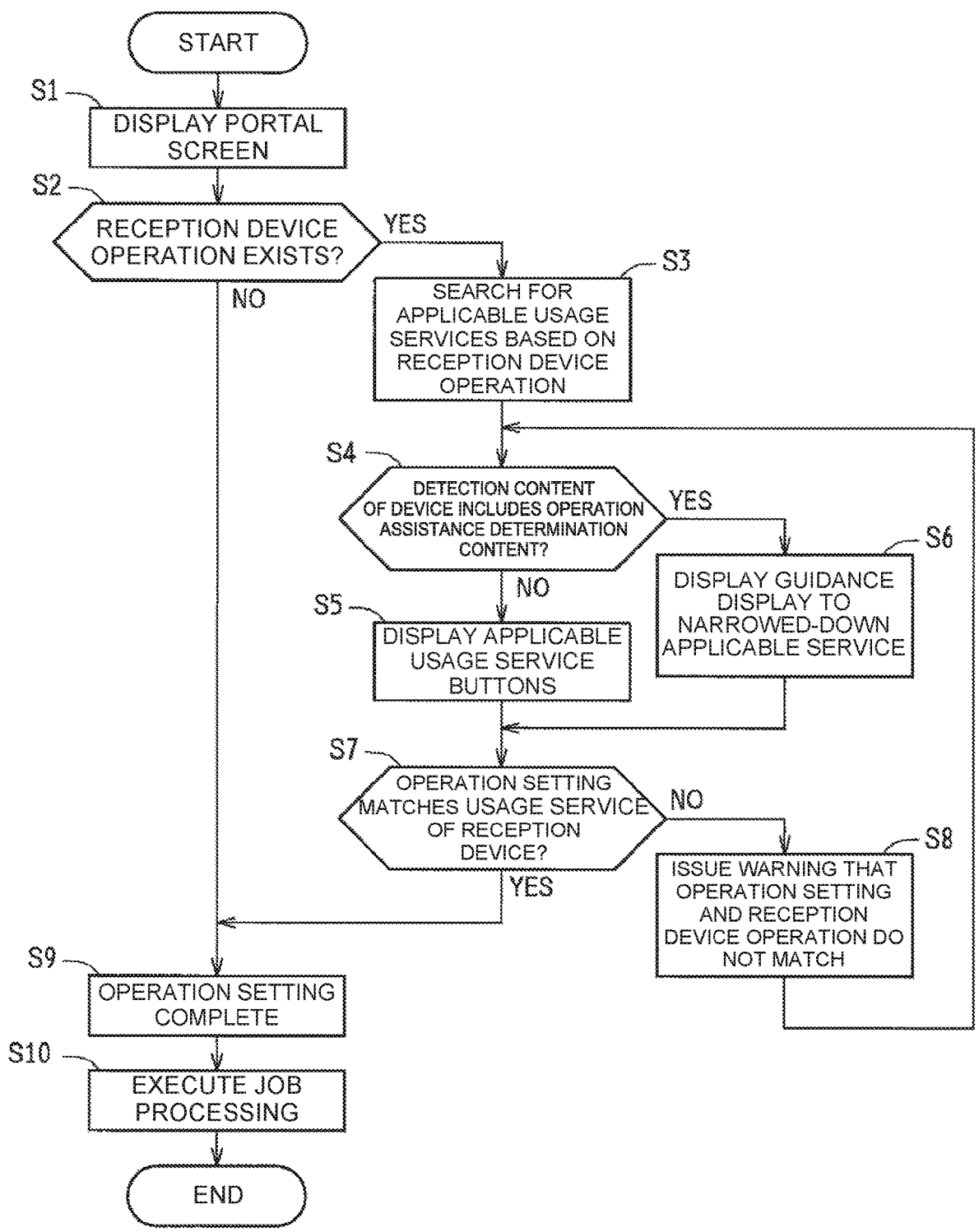
FIG. 2 is a flowchart showing a processing procedure that is performed when a service is provided by the image forming device.

FIG. 2 is a flowchart showing a processing procedure that is performed when a service is provided by the image forming device 10. When the user starts to operate the image forming device 10, a portal screen (see FIG. 3) is displayed on the touch panel 11 (S1). In the image forming device 10, the user may select the service to be used by only performing a button operation from the portal screen. However, it is also possible to receive service selection support by performing an operation with respect to a reception device before performing a button operation. Consequently, the image forming device 10 confirms whether or not an operation has been performed with respect to a reception device (S2).

That is to say, if the user has performed an operation with respect to a reception device before performing an operation with respect to the portal screen of the touch panel 11 (S2:YES), the controller 12 recognizes the reception device that has been operated, and searches for the usage services (applicable services) that are applicable to the reception device (S3). Further, it is confirmed whether or not operation assistance determination content exists in the detection content of the reception device (S4).

Based on the result of steps S3 and S4, the image forming device 10 switches the operation screen of the touch panel 11 to a screen that preferentially displays the applicable services of the reception device that has been operated. Here, if no operation assistance determination content exists in the detection content of the reception device (S4:NO), it is possible to show an operation screen displaying the service buttons of the usage services found in S3 (S5). Furthermore, if operation assistance determination content exists in the detection content of the reception device (S4:YES), the applicable services are further narrowed down according to the operation assistance determination content, and it is possible to show a guidance display to a narrowed-down applicable service (S6).

The search for applicable services in step S3 and the confirmation of operation assistance determination content in step S4 are performed according to a usage service correspondence table stored in advance in a memory inside the image forming device 10. FIG. 4 is a diagram showing an example of a usage service correspondence table.

For example, if the operation of the reception device performed by the user is the placement of a document on the document reader 13, it can be determined that the service intended by the user is a service that requires reading of a document (a copy, fax, or scanning service). That is to say, in the usage service correspondence table in FIG. 4, if the reception device that has been operated is the document reader 13, the copy, fax, and scanning services are found as applicable services.

Furthermore, if a document is placed on the document reader 13, the controller 12 is capable of confirming whether or not operation assistance determination content exists from image data of the document scanned by the document reader 13. That is to say, when the reception device is the document reader 13, detection content such as the document size or the specific document type (such as a driver's license/card, postcard, or photograph) can be obtained from the scanned image data. The specific document type can be determined by OCR processing of the image data to extract specific character strings, or by extracting a characteristic pattern image. In addition, known algorithms can be applied to such a determination.

In the example of the usage service correspondence table in FIG. 4, the document types such as a driver's license/card, postcard, or photograph are regarded as operation assistance determination content. That is to say, if a specific document type is not determined from the image data, the display of the touch panel 11 switches from the portal screen of FIG. 3 to a screen (see FIG. 5) that displays only the service buttons of the usage services (in this case, copy, fax, and scanning services) found in step S3 (S5). In the screen shown in FIG. 5, the service buttons that are displayed are only for services that require reading of a document, which supports service selection by the user. This makes it easier for the user to perform the service selection operation, and improves the convenience of the image forming device 10.

Furthermore, if a specific document type is determined from the image data, the image forming device 10 is capable of showing a guidance display to a copy mode which is suitable for the document type. For example, the image forming device 10 has a "Driver's License/Card" copy mode suitable for copying driver's licenses and cards, a "Postcard" copy mode suitable for copying postcards, and a "Photograph" copy mode suitable for copying photographs. If the user wishes to select these copy modes from the display screen shown in FIG. 5, the user selects the "Mixed Copies" mode, and selects the desired copy mode from the switched display screen (a screen displaying service buttons such as "Copy→Driver's License/Card", "Copy→Postcard", and "Copy→Photograph").

On the other hand, if a specific document type is determined from the image data, for example, if the document that has been read is identified as a driver's license, a guidance display to the "Mixed Copies" service button is shown to guide the user to the "Driver's License/Card" copy mode. For example, a guidance display method such as changing the arrangement of the service buttons of the screen in FIG. 5 to bring the "Mixed Copies" button to the front (see FIG. 6), or displaying the "Mixed Copies" button with a larger size than the other service buttons (see FIG. 7) can be considered. Note that the guidance display method of the service buttons is not particularly limited. Other methods that display the service button to be guided to with a blinking display or a red outline display are also possible. Then, after the "Mixed Copies" button is pressed by the user, a guidance display to the "Copy→Driver's License/Card" service button can be shown on the switched display screen.

If it is determined that the document that has been read is a postcard or a photograph, a guidance display to the "Mixed Copies" service button is displayed in the same way. Then, in the display screen after the "Mixed Copies" button is pressed, a guidance display to the "Copy→Postcard" or "Copy→Photograph" service button is displayed.

Figure 5:
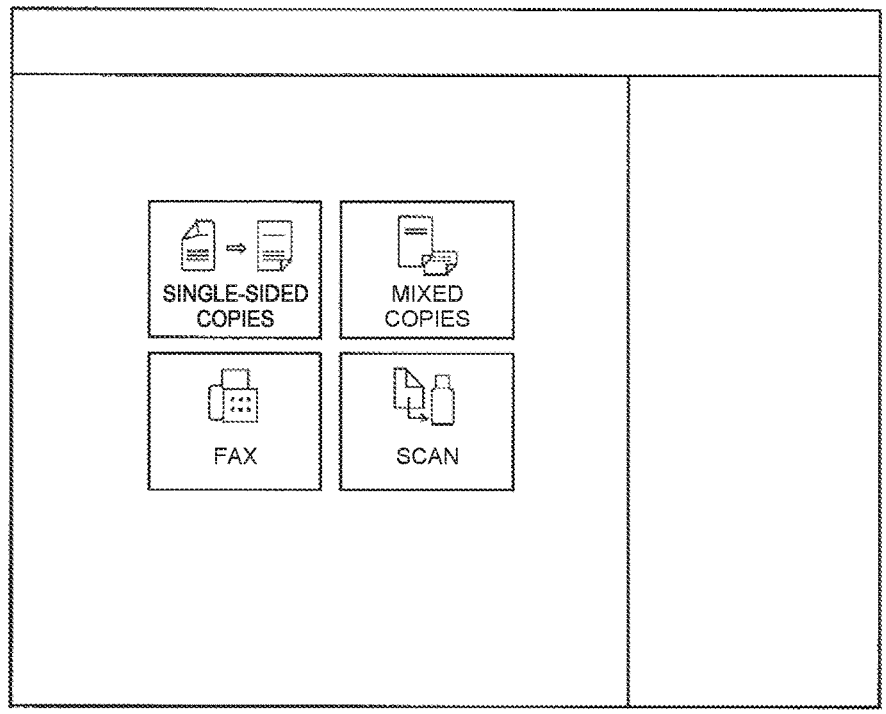
FIG. 5 is a diagram showing an example of an operation screen displayed on the touch panel.
Figure 6:
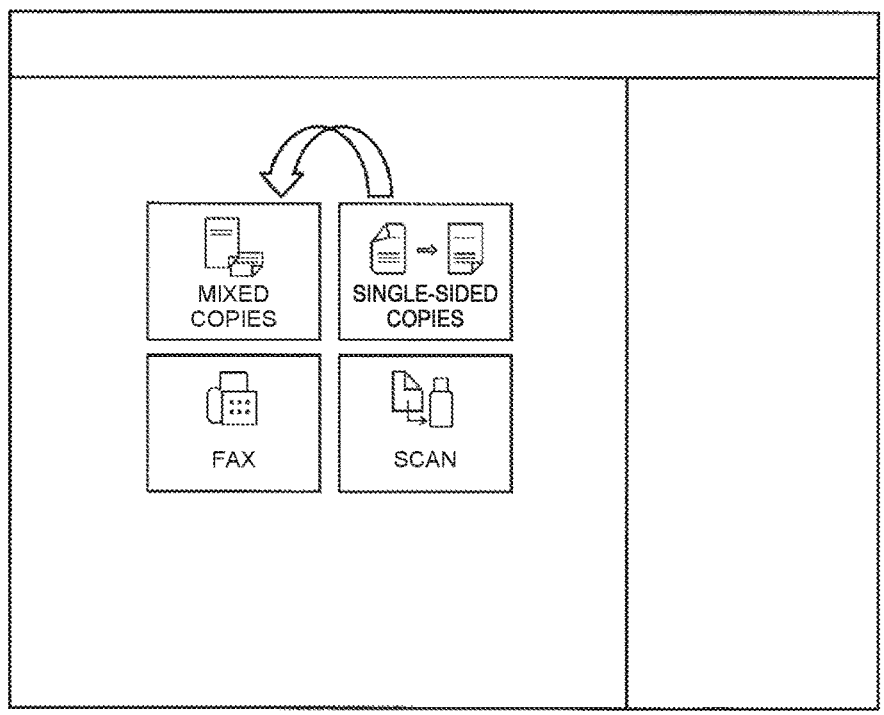
FIG. 6 is a diagram showing an example of an operation screen displayed on the touch panel.
Figure 7:
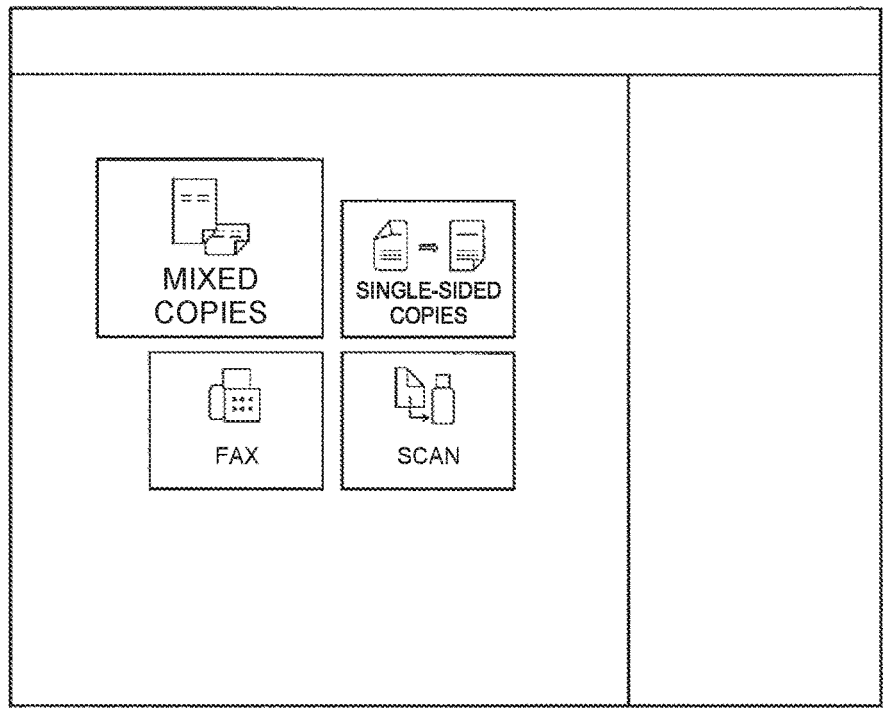
FIG. 7 is a diagram showing an example of an operation screen displayed on the touch panel.

The guidance displays shown in FIG. 5 and FIG. 6 are for guiding to the most likely usage services and copy modes for the determined document type. However, the service buttons for the other usage services and copy modes are also displayed. This is because even if the document placed on the document reader 13 is a driver's license or a card, it is not certain that the service intended by the user is a copy service. It is also possible that the user intends to use the scanning or fax services.

If the result of step S2 is YES, and the reception device is the NFC card reader 16, it can be determined that the service intended by the user is a service that can be accessed by reading an NFC card (an administrative service or network printing service). That is to say, in the usage service correspondence table in FIG. 4, when the reception device that has been operated is the NFC card reader 16, the administrative service and the network printing service are found as applicable services, and these service buttons are then displayed.

Figure 8:
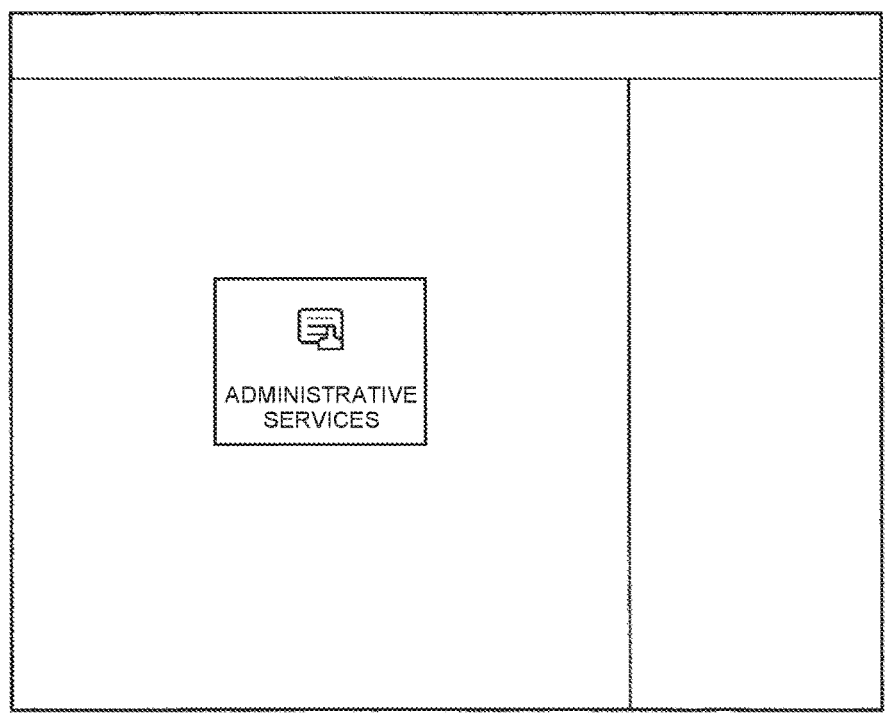
FIG. 8 is a diagram showing an example of an operation screen displayed on the touch panel.

Further, the NFC card reader 16 is capable of determining the type of NFC card to be read (such as a basic resident card, My Number card, electronic money card, or employee ID card). In this case, the type of the NFC card becomes the operation assistance determination content For example, if it is determined that the NFC card that has been read is a basic resident card or a My Number card, it can be determined that the service intended by the user is the administrative service. As a result, the display of the touch panel 11 switches from the portal screen of FIG. 3 to a screen displaying only the administrative service button (see FIG. 8).

Figure 3:
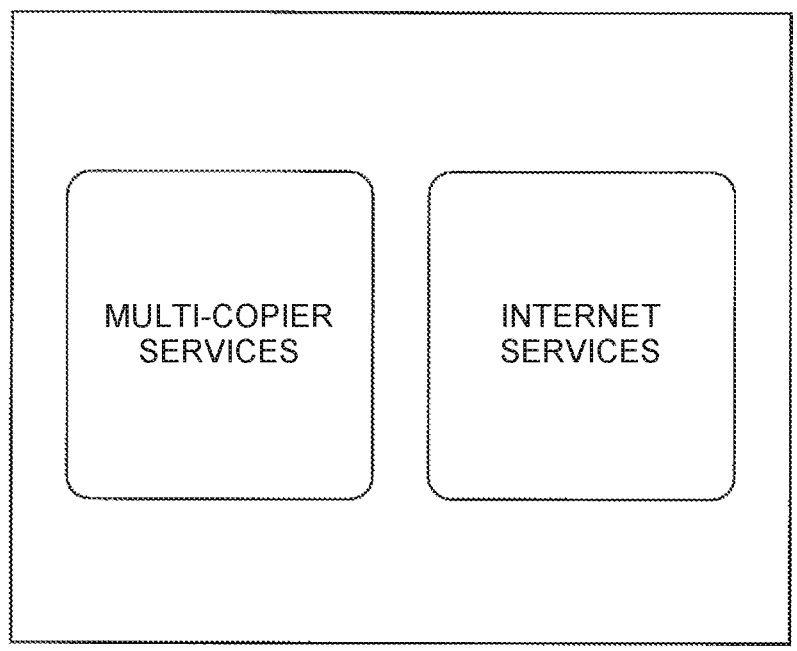
FIG. 3 is a diagram showing an example of a portal screen displayed on the touch panel.

If it is determined that the NFC card that has been read is an electronic money card, the display switches to an MFP portal screen (assuming that there are no billing and payment services included as Internet services of the image forming device 10). The MFP portal screen is a screen that is switched to when the "Multi-Copier Services" button on the portal screen of FIG. 3 is pressed, and is a portal screen that displays only the service buttons of the services that use the various functions of the multi-copier (such as the copy function, fax function, scan function, or print function). Furthermore, if it is determined that the NFC card that has been read is an employee ID card, the display shifts to a corporate account screen for network printing.

If the result of step S2 is YES, and the reception device is the QR code reader 15, it can be determined that the service intended by the user is a service that can be accessed by reading a QR code (the network printing, content printing, or ticket reservation service). That is to say, in the usage service correspondence table in FIG. 4, when the reception device that has been operated is the NFC card reader 16, the administrative service and the network printing service are found as applicable services, and these service buttons are then displayed.

Moreover, if the reception device is the QR code reader 15, the number of characters (digits) in the decoded QR code can be used as operation assistance determination content. For example, because the network printing service, the content service, and the MMK payment service each use a different number of characters (such as 10 alphanumeric characters or 12 alphanumeric characters), the service can be determined according to the number of characters in the QR code.

Figure 9:
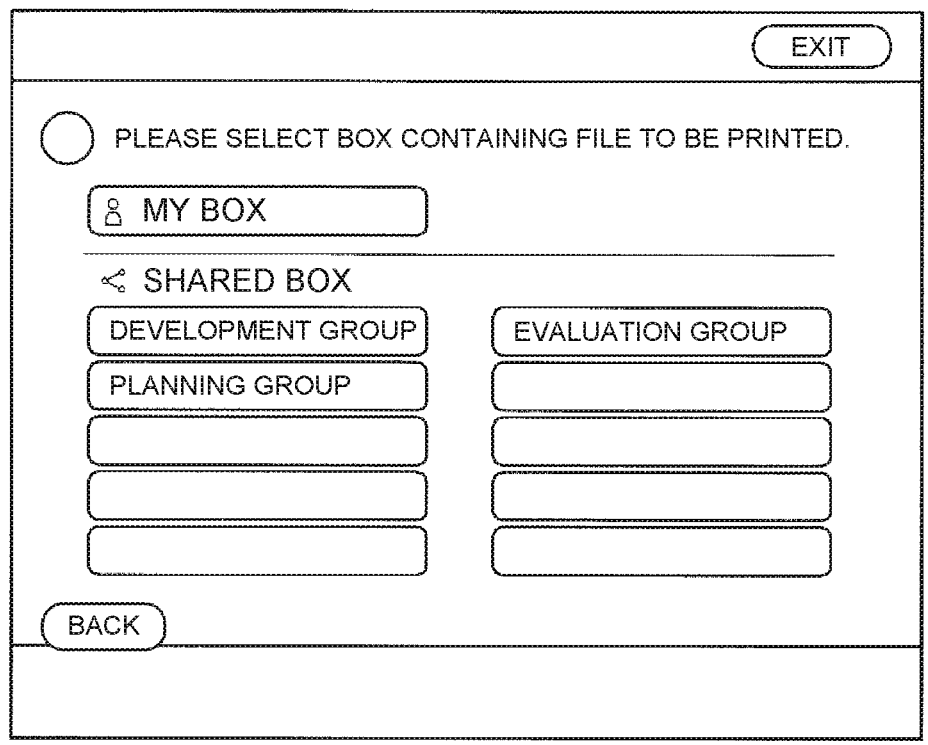
FIG. 9 is a diagram showing an example of an operation screen displayed on the touch panel.

For example, if it is determined that the QR code that has been read is a network printing service code, the display shifts to a service login screen of the network printing service (see FIG. 9). If it is determined that the QR code that has been read is a content printing service code, the display shifts to a content confirmation screen of the content printing service. If it is determined that the QR code that has been read is a QR code electronic money code, the display switches to an MFP portal screen (assuming that there are no billing and payment services included as Internet services of the image forming device 10). Furthermore, if it is determined that the QR code that has been read is a ticket reservation code, the display shifts to an MMK ticket reservation confirmation screen.

In addition, if the result of step S2 is YES, and the reception device is the media reader 14, it can be determined that the service intended by the user is a printing service that prints the data in a recording medium. That is to say, in the usage service correspondence table in FIG. 4, when the reception device that has been operated is the media reader 14, printing services are found as applicable services, and these service buttons are then displayed.

Further, when the reception device is the media reader 14, it is possible to use the data type in the recording medium as the operation assistance determination content. For example, depending on the data file extension, it is possible to determine whether the data is Office data such as Excel or Word data, or image data such as JPEG or TIFF data.

For example, if it is determined that the data in the recording medium is Office data, an Office direct printing service button is displayed. If it is determined that the data inside the recording medium is image data, an image printing service button is displayed. Furthermore, if both Office data and image data are in the recording medium, both an Office direct printing service button and an image printing service button are displayed.

In steps S5 and S6, the user can perform an operation setting (a selection setting of the usage service) while receiving support for service selection on the operation screen of the touch panel 11. When an operation setting is performed by the user, the image forming device 10 confirms whether or not the service set by the user in the operation setting matches the applicable services of the reception device that has been operated in step S2 (S7).

If the service set by the user in the operation setting matches the applicable services of the reception device (S7:YES), the operation setting of the usage service is completed (S9), and a job is executed by the usage service set in the operation setting (S9). On the other hand, if the service set by the user in the operation setting does not match the applicable services of the reception device (S7:NO), the image forming device 10 displays a pop-up screen indicating that there is a mismatch between the operation setting and the reception device operation on the touch panel 11 or the like for a certain period of time (S8), and returns to step S4.

In other words, if the result of S7 is NO, it is deduced that there is a setting error in the service set by the user in the operation setting. Therefore, it is possible to return to step S4 so that the user can repeat the setting step. In a multi-copier used by an unspecified number of users, if the previous user leaves during an operation, a next user may sometimes attempt to use a different service. For example, a mismatch between the operation setting and the reception device operation may occur when the previous user leaves after performing an operation setting that selects the MMK service (without using the service), and the next user inserts a USB memory in an attempt to use the print service. In such a case, the warning in step S8 enables the next user to understand the reason for the mismatch, and can prompt the next user to cancel the operation setting made by the previous user.

As described above, in the image forming device 10 according to the present embodiment, at the time of usage service selection in the multi-copier, in addition to the general procedure of touch operations performed with respect to a service button from the touch panel 11, by detecting operations made with respect to a reception device other than the touch panel 11, it is possible to automatically switch to an operation screen which is narrowed down to the applicable services of the reception device that has been operated. An operation screen which is narrowed down to the applicable services in this way allows the user is able to omit the effort of selecting the desired service from among a plurality of service buttons, and the desired service can be quickly selected and set.

Second Embodiment

In the first embodiment described above, it has been described that when the user performs an operation with respect to a reception device before performing an operation with respect to the touch panel 11, the user can receive support for usage service selection on the operation screen of the touch panel 11. However, the present invention is not limited to this. The user can also receive support for usage service selection on the operation screen of the touch panel 11 in a case where the user has further performed an operation with respect to the reception device after partially performing a setting operation for usage service selection on the touch panel 11. That is to say, it is possible to show a priority display of the applicable services in such a way to reflect both the operation setting status performed on the touch panel 11 and the operation status of the reception device.

For example, when the user selects an Internet service (MMK service) on the portal screen of the touch panel 11, and reads a QR code with the QR code reader 15, usage service buttons such as tickets and coupons can be displayed as the product of the usage services included in the MMK service and the applicable services when the QR code reader 15 is operated.

Alternatively, when the user selects a photograph printing service on the MFP portal screen and reads a USB memory using the media reader 14, even when Office data (such as Excel data) and image data (such as JPEG data) both exist in the USB memory, it is possible to show a folder display after reading only the image data based on the fact that a photograph printing service has been selected.

The embodiments disclosed herein are illustrative in every respect, and do not serve as a basis for a limited interpretation. Therefore, the technical scope of the present invention is not interpreted based on only the above-described embodiments but are defined based on the scope of the claims. Furthermore, the technical scope of the present invention includes all variations that are equivalent in meaning and scope to the claims

What is claimed is:

1. An image forming device capable of providing a plurality of types of usage services, and which requires an operation setting for selecting a usage service at the time of use, comprising:
   an operation acceptor that accepts an operation by a user while presenting an operation screen; and
   a controller that controls the operation screen of the operation acceptor; wherein
   at least some of the usage services further require an operation with respect to a reception device which is either provided in the image forming device or connected to the image forming device, and the controller, in a case where an operation of the reception device is performed before an operation setting for usage service selection is performed by the operation acceptor, switches to an operation screen that shows a preferential display of a usage service which is applicable to the reception device that has been operated.

2. The image forming device according to claim 1, wherein in the preferential display, it is possible to selectively display only a service button of a usage service which is applicable to the reception device that has been operated.

3. The image forming device according to claim 1, wherein a usage service correspondence table that associates the reception device and a usage service which is applicable to the reception device is stored in advance, and the preferential display is based on the usage service correspondence table.

4. The image forming device according to claim 1, wherein the controller is capable of confirming whether or not operation assistance determination content exists in a detection content of the reception device, and when the operation assistance determination content exists, further narrows down the usage service which is applicable according to the operation assistance determination content, and shows a guidance display to a narrowed-down usage service.

5. The image forming device according to claim 1, wherein the controller, in a case where an operation of the reception device is further performed after an operation setting for usage service selection has been partially performed by the operation acceptor, shows a preferential display of a usage service in such a way to reflect both a setting status by the operation setting and an operation status of the reception device.

\* \* \* \* \*